(12) United States Patent
Wallander

(10) Patent No.: US 10,152,176 B2
(45) Date of Patent: Dec. 11, 2018

(54) TOUCH SENSITIVE APPARATUS WITH IMPROVED SPATIAL RESOLUTION

(71) Applicant: Flatfrog Laboratories AB, Lund (SE)

(72) Inventor: Mats Petter Wallander, Lund (SE)

(73) Assignee: FlatFrog Laboratories AB, Lund (SE)

( * ) Notice: Subject to any disclaimer, the term of this patent is extended or adjusted under 35 U.S.C. 154(b) by 105 days.

(21) Appl. No.: 15/103,635

(22) PCT Filed: Nov. 17, 2014

(86) PCT No.: PCT/SE2014/051363
§ 371 (c)(1),
(2) Date: Jun. 10, 2016

(87) PCT Pub. No.: WO2015/076731
PCT Pub. Date: May 28, 2015

(65) Prior Publication Data
US 2016/0357348 A1    Dec. 8, 2016

(30) Foreign Application Priority Data

Nov. 22, 2013    (SE) .................................... 1351390

(51) Int. Cl.
*G06F 3/042*      (2006.01)

(52) U.S. Cl.
CPC .. *G06F 3/0421* (2013.01); *G06F 2203/04109* (2013.01)

(58) Field of Classification Search
CPC ..................... G06F 3/0421; G06F 2203/04109
See application file for complete search history.

(56) References Cited

U.S. PATENT DOCUMENTS

| 3,673,327 A | 6/1972 | Johnson et al. |
| 4,254,333 A | 3/1981 | Bergstrom |
| (Continued) | | |

FOREIGN PATENT DOCUMENTS

| WO | WO-2009/077962 A2 | 6/2009 |
| WO | WO-2010/006884 A2 | 1/2010 |
| (Continued) | | |

OTHER PUBLICATIONS

International Search Report PCT/ISA/210 for International Application No. PCT/SE2014/051363 dated Dec. 2, 2015.

(Continued)

*Primary Examiner* — Christopher E Leiby
(74) *Attorney, Agent, or Firm* — Knobbe, Martens, Olson & Bear, LLP

(57) ABSTRACT

A touch-sensitive apparatus comprising a panel defining a touch surface; a first set of opposite and essentially parallel rows of components, and a second set of opposite and essentially parallel rows of components. The second set of opposite and parallel rows being essentially orthogonal to the first set of opposite and parallel rows. The components include emitters and detectors, each emitter being operable for propagating an energy beam across the touch surface inside the panel, and each detector being operable for detecting transmitted energy from at least one emitter. Two of the rows of the first and second set are interleaved rows each having an interleaved distribution of emitters and detectors, and the further two rows of the first and second set are base rows each having a distribution of components comprising at least 70% emitters or detectors.

19 Claims, 6 Drawing Sheets

(56) References Cited

U.S. PATENT DOCUMENTS

| | | | |
|---|---|---|---|
| 7,432,893 B2 | 10/2008 | Ma et al. | |
| 8,139,046 B2* | 3/2012 | Kweon | G06F 3/0421 178/18.01 |
| 8,581,884 B2 | 11/2013 | Fahraeus et al. | |
| 8,780,066 B2 | 7/2014 | Christiansson et al. | |
| 8,890,843 B2 | 11/2014 | Wassvik et al. | |
| 8,902,196 B2 | 12/2014 | Goertz et al. | |
| 2002/0075243 A1* | 6/2002 | Newton | G06F 3/0421 345/173 |
| 2006/0114237 A1* | 6/2006 | Crockett | G06F 3/0421 345/173 |
| 2006/0144237 A1 | 7/2006 | Liang et al. | |
| 2011/0074734 A1 | 3/2011 | Wassvik et al. | |
| 2011/0115748 A1* | 5/2011 | Xu | G06F 3/0421 345/175 |
| 2011/0157096 A1 | 6/2011 | Drumm | |
| 2011/0163998 A1 | 7/2011 | Goertz et al. | |
| 2011/0169780 A1 | 7/2011 | Goertz et al. | |
| 2011/0227874 A1* | 9/2011 | Fahraeus | G06F 3/0421 345/175 |
| 2011/0234537 A1 | 9/2011 | Kim et al. | |
| 2011/0261020 A1* | 10/2011 | Song | G06F 3/0421 345/175 |
| 2012/0212441 A1 | 8/2012 | Christiansson et al. | |
| 2012/0249485 A1* | 10/2012 | Ye | G06F 3/0421 345/175 |
| 2013/0044073 A1 | 2/2013 | Christiansson et al. | |
| 2013/0181896 A1* | 7/2013 | Gruhlke | G06F 3/017 345/156 |
| 2014/0125633 A1 | 5/2014 | Fåhraeus et al. | |
| 2014/0267124 A1 | 9/2014 | Christiansson et al. | |
| 2014/0300572 A1 | 10/2014 | Ohlsson et al. | |
| 2015/0083891 A1* | 3/2015 | Wallander | G06F 3/0421 250/206.1 |
| 2017/0177163 A1* | 6/2017 | Wallander | G06F 3/042 |

FOREIGN PATENT DOCUMENTS

| | | |
|---|---|---|
| WO | WO-2010/015408 A1 | 2/2010 |
| WO | WO-2010/046539 A1 | 4/2010 |
| WO | WO-2010/064983 A2 | 6/2010 |
| WO | WO-2011/049511 A1 | 4/2011 |
| WO | WO-2011/049513 A1 | 4/2011 |
| WO | WO-2011/139213 A1 | 11/2011 |
| WO | WO-2012/050510 A1 | 4/2012 |
| WO | WO-2012/105893 A1 | 8/2012 |
| WO | WO-2013/089622 A2 | 6/2013 |
| WO | WO-2013/176613 A2 | 11/2013 |
| WO | WO-2013/176614 A2 | 11/2013 |
| WO | WO-2013/176615 A2 | 11/2013 |

OTHER PUBLICATIONS

Written Opinion of the International Searching Authority PCT/ISA/237 for International Application No. PCT/SE2014/051363 dated Dec. 2, 2015.

* cited by examiner

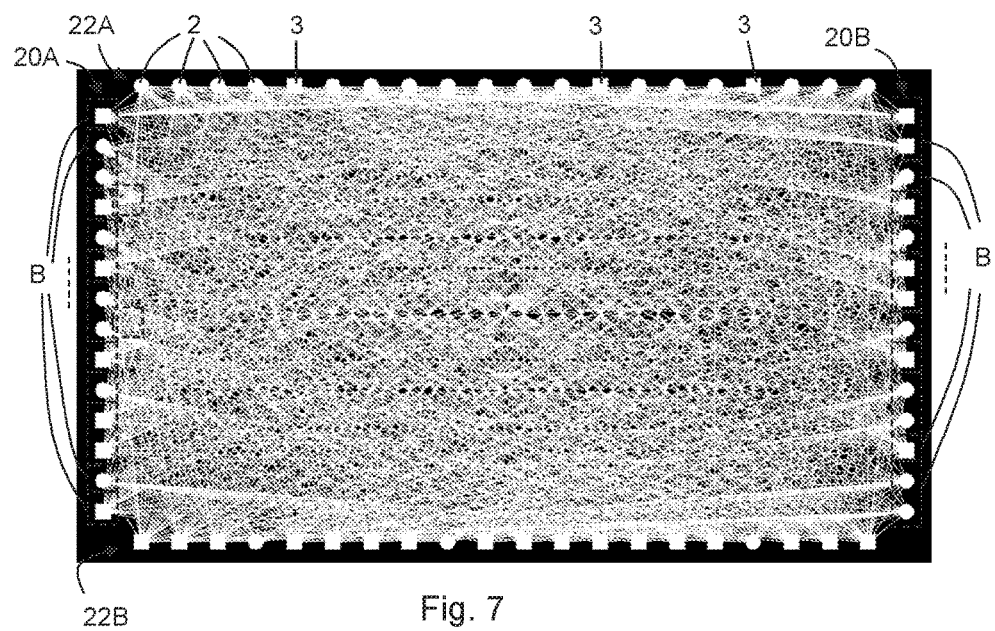
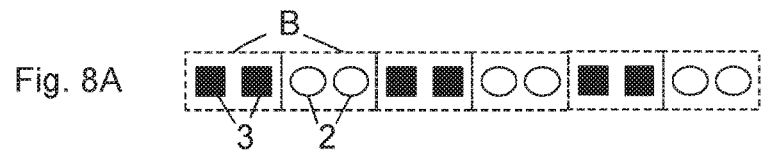
Fig. 8A
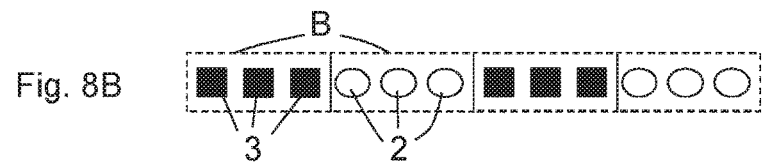
Fig. 8B
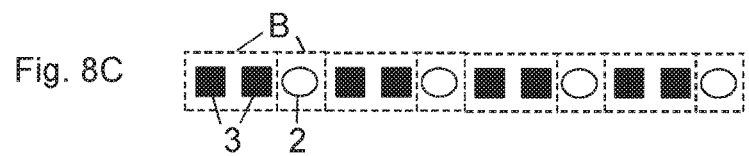
Fig. 8C
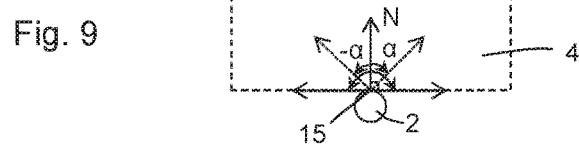
Fig. 9

TOUCH SENSITIVE APPARATUS WITH IMPROVED SPATIAL RESOLUTION

CROSS-REFERENCE TO RELATED APPLICATIONS

The present application claims the benefit of Swedish patent application No. 1351390-8, filed on Nov. 22, 2013.

FIELD OF THE INVENTION

The present invention relates to a touch sensitive apparatus that operates by propagating energy beams across a touch surface inside a panel.

BACKGROUND OF THE INVENTION

This type of touch-sensitive apparatus is known in the art. It may be implemented to operate by transmitting light inside a solid light transmissive panel, which defines two parallel boundary surfaces connected by a peripheral edge surface. Light generated by a plurality of emitters is coupled into the panel so as to propagate by total internal reflection (TIR) between the boundary surfaces to a plurality of detectors. The light thereby defines propagation paths across the panel, between pairs of emitters and detectors. The emitters and detectors are arranged such that the propagation paths define a grid on the panel. An object that touches one of the boundary surfaces ("the touch surface") will attenuate ("frustrate") the light on one or more propagation paths and cause a change in the light received by one or more of the detectors. The location (coordinates), shape or area of the object may be determined by analyzing the received light at the detectors. This type of apparatus has an ability to detect plural objects in simultaneous contact with the touch surface, known as "multi-touch" in the art.

In one configuration, e.g. disclosed in U.S. Pat. Nos. 3,673,327, 4,254,333 and US2006/0114237, the emitters and detectors are arranged in rows on opposite ends of the panel, and the light is propagated between opposite pairs of emitters and detectors so as to define a rectangular grid of propagation paths.

As an alternative, U.S. Pat. No. 7,432,893 proposes the use of a few large emitters arranged at the corners of the panel, or centrally on each end of the panel, to inject diverging light beams ("fan beams") into the panel for receipt by arrays of detectors along all ends of the panel. This configuration may enable an increased spatial resolution for a given number of emitters and detectors, by increasing the density of the grid of propagation paths. The spatial resolution indicates the smallest object that can be detected by the touch-sensitive apparatus at a given location on the touch surface.

In an alternative configuration, e.g. disclosed in WO2009/077962, US2011/0234537, US2011/0157096, rows of regularly spaced fan beam emitters and detectors, respectively, are arranged on opposite ends of the panel to define a dense grid of propagation paths across the touch surface.

WO2010/064983 discloses further alternative configurations. In one configuration, which is intended to improve the uniformity of the grid of propagation paths, fan beam emitters and detectors are alternated with equal spacing around the periphery of the touch surface. In another configuration, which is intended to reduce interference phenomena that may occur when different emitters concurrently inject light of the same wavelength into the panel, fan beam emitters and detectors are arranged with randomized spacing around the periphery of the touch surface.

In this type of touch-sensitive apparatus, there is a continued desire to improve the spatial resolution with respect to the uniformity of the spatial resolution across the touch surface or the minimum detectable object size at a given position on the touch surface.

The touch-sensitive technology is further incorporated into consumer products which face challenges such as cost reduction to be competitive products. There is thus desire to reduce cost without endangering the user experience. The components of the touch-sensitive apparatus might also be exposed to disturbances such as ambient noise and noise from the apparatus itself. It is an ongoing desire to reduce the impact of disturbances to the components.

SUMMARY OF THE INVENTION

It is an objective of the invention to at least partly overcome one or more limitations of the prior art.

Another objective is to enable an improved spatial resolution for a given number of electro-optical components in a touch-sensitive apparatus that operates by propagating energy beams across a touch surface inside a panel.

A further objective is to provide an apparatus at a reduced cost without influencing the user experience.

A still further objective is to provide an apparatus that is less sensitive to disturbances than some prior apparatuses.

One or more of these objectives, as well as further objectives that may appear from the description below, are at least partly achieved by means of a touch-sensitive apparatus according to the independent claim, embodiments thereof being defined by the dependent claims.

One aspect of the invention is a touch-sensitive apparatus which comprises a panel defining a touch surface; a first set of opposite and essentially parallel rows of components, and a second set of opposite and essentially parallel rows of components. The second set of opposite and parallel rows is essentially orthogonal to the first set of opposite and parallel rows. The components include emitters and detectors, each emitter being operable for propagating an energy beam across the touch surface inside the panel, and each detector being operable for detecting transmitted energy from at least one emitter. Two of the rows of the first and second set are interleaved rows each having an interleaved distribution of emitters and detectors, and the further two rows of the first and second set are base rows each having a distribution of components comprising at least 70% emitters or detectors.

This aspect is based on the insight that the configurations of prior art solutions, which propagate diverging energy beams inside a panel and have alternating components of emitters and detectors in opposite rows, will result in a convergence of the propagation paths, typically towards the center line between the opposite rows. Thereby, the grid of propagation paths will exhibit increased spatial gaps without propagation paths, or angular gaps without propagation paths in large angular intervals, which is equal to a locally reduced spatial resolution and/or accuracy. A spatial gap is an area between propagation paths exhibiting no propagation paths. Also, prior art solutions having an "L-shaped" distribution of components such that two adjacent orthogonal rows comprise the same type of component will result in gaps without propagation paths or without propagation paths in large angular intervals. To overcome these drawbacks, the first aspect applies the design rule that the apparatus comprises four rows of components, wherein two rows are interleaved rows and the other two rows each has a distribution of components comprising at least 70% emitters or detectors. By applying this design rule, the number of propagation paths with different angles may be increased and the propagation paths may be more evenly distributed over the touch surface. By proper choice and arrangement of components, the first aspect thus provides an improved distribution of detection lines with different angles over the touch surface for a given number of components, compared to conventional arrangements of components. Thus, the spatial resolution and/or accuracy of the touch surface can be increased, or, the spatial resolution and/or accuracy can be essentially maintained with a reduced number of components. A reduced number of components might imply a reduced cost for the apparatus.

A detection line can be defined by a distance from a centre point of the touch surface, and an angle from e.g. a horizontal line through the centre point. To obtain a certain spatial resolution and accuracy, it is desired that each point on the touch surface shall have a certain number of detection lines within a distance to the point, and with a distribution of angles for the detection lines. According to one embodiment, each point on the touch surface shall have detection lines with an angle of less than 20°, preferably less than 10°, in between the angles between detection lines within a distance to the point. The distance may e.g. be an approximated radius of a fingerpalm.

The components may be arranged in connection with one or several printed circuit boards (PCBs), and connected to a plurality of distributed processors on the PCBs. For example, a certain number of components may be connected to the same processor. It may be desired to connect only one type of component to the same processor, as it may be an easier implemented solution. For example, signals from the same component type should be treated in the same way by the processor. Further, by having separate processors for different component types, the influence of the emitters to the detectors may be reduced. Base rows with at least 70% of one type of component might thus be easier to implement than rows with a more even distribution of components.

According to one embodiment, the interleaved rows constitute the first set of opposite and parallel rows.

According to another embodiment, the interleaved rows constitute one row of the first set of opposite and parallel rows, and one row of the second set of opposite and parallel rows.

According to one embodiment, the base rows comprises one row with X numbers of emitters and one row with Y numbers of detectors, wherein X is different from Y. Thus, the number of emitters in one base row may be greater than the number of detectors in the other base row. Or, the number of emitters in the one base row may be less than the number of detectors in the other base row.

According to one embodiment, one of the base rows has a distribution of components comprising at least 70% emitters and the other base row has a distribution of components comprising at least 70% detectors. Thus, one of the base rows has a majority of components being emitters, and the other base row has a majority of components being detectors. Thereby more detection lines can be obtained, whereby size of spatial and/or angular gaps, e.g. around the centre line C, in the grid of propagation paths can be reduced.

According to a further embodiment, the base rows comprise one row with only emitters and one row with only detectors. The components of the apparatus may be sensitive to disturbances. The detectors are to detect the energy propagating in the panel, and the detected energy might be of a small quantity compared to disturbances e.g. from the emitters or ambient light or noise. By having a base row with almost only detectors the risk that the detected energy, detected with the detectors, becomes disturbed by the emitters is reduced as the emitters are located more distant from the detectors than before.

According to one embodiment, at least one of the base rows comprises at least 80% emitters or detectors, more preferably at least 90% emitters or detectors.

According to one embodiment, at least one of the base rows has a random distribution of emitters and/or detectors.

According to one embodiment, "interleaved distribution" is defined by a consecutive, non-overlapping distribution of alternating blocks with components being either only emitters or only detectors, wherein each block B comprises a maximum of two or three components. Thus, any adjacent blocks have different types of components. The type of "interleaved distribution" can be varied. According to one embodiment, the interleaved distribution is of a type single interleaved, wherein each block B comprises only one component. According to another embodiment, the interleaved distribution is of a type multiple interleaved, wherein each block B comprises a same multiple of components. According to a further embodiment, the interleaved distribution is of a type semi-interleaved, wherein blocks with the same type of components has the same number of components, and wherein the number of emitters in a block B is not the same as the number of detectors in another block B. According to a still further embodiment, the interleaved distribution is of a type irregular-interleaved, wherein the number of components in each block B is irregularly chosen. For example, the number of components in each block B may be randomly chosen.

According to one embodiment, each emitter is being operable for propagating a diverging beam. According to a further embodiment, each emitter is being operable for propagating a diverging beam with a beam diverging angle $\alpha$ from $\pm 45°$ to $\pm 90°$ from a normal of a beam direction surface of the emitter, the beam diverging angle $\alpha$ being parallel to the touch surface. For example, the diverging angle may be $\pm 45°$, $\pm 60°$, $\pm 75°$ or $\pm 90°$.

According to one embodiment, the components are electro-optical components that are configured to generate radiation and/or energy and detect radiation and/or energy, respectively.

According to one embodiment, each detector is being operable for detecting transmitted energy from at least two emitters. According to one embodiment, each detector is configured to receive energy within a range of angles of incidence. In one implementation, each emitter is configured to generate radiation and is optically coupled to the panel so as to propagate a diverging beam of radiation across the touch surface by internal reflections inside the panel, and wherein each detector is configured to detect radiation and is optically coupled to the panel so as to detect transmitted radiation from the at least two emitters.

According to one embodiment, said first set of rows of components and said second set of rows of components define a perimeter of non-overlapping and consecutive components around the touch surface. According to a further embodiment, the touch surface has a rectangular form, and each opposite and parallel row of components of the first set is arranged along one short side of the touch surface, and wherein each opposite and parallel row of components of the second set is arranged along one long side of the touch surface.

According to one embodiment, each row comprises at least 20 components, and preferably at least 30 components.

Preferred embodiments are set forth in the dependent claims and in the detailed description.

SHORT DESCRIPTION OF THE APPENDED DRAWINGS

Below the invention will be described in detail with reference to the appended figures, of which:

FIGS. 5-7 are top plan views of grids of detection lines in an apparatus which is designed in accordance with embodiments of the invention.

FIGS. 8A-8C are illustrating different interleaved distributions according to some embodiments.

FIG. 9 is illustrating a beam diverging angle α from an emitter.

DETAILED DESCRIPTION OF PREFERRED EMBODIMENTS OF THE INVENTION

Figure 1A:
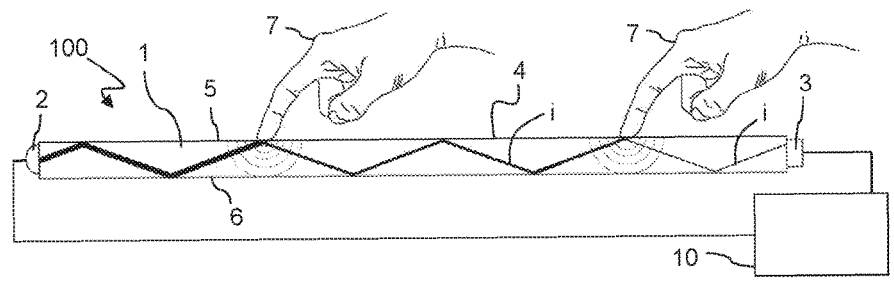
FIGS. 1A-1B are section and top plan views of an optical touch-sensitive apparatus.

In the following, examples of the present invention will be given in relation to a touch-sensitive apparatus designed to operate by light transmission. Throughout the description, the same reference numerals are used to identify corresponding elements.

Figure 1B:
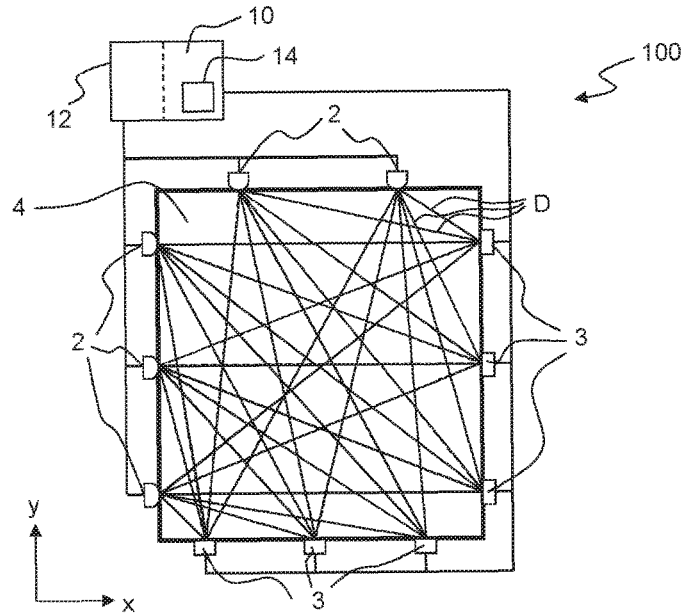

FIGS. 1A-1B illustrates an example embodiment of a touch-sensitive apparatus 100 that is based on the concept of FTIR (Frustrated Total Internal Reflection). The apparatus 100 operates by transmitting light inside a panel 1, from light emitters 2 to light sensors or detectors 3, so as to illuminate a touch surface 4 from within the panel 1. The panel 1 is made of solid material in one or more layers and may have any shape. The panel 1 defines an internal radiation propagation channel, in which light propagates by internal reflections. In the example of FIG. 1, the propagation channel is defined between the boundary surfaces 5, 6 of the panel 1, where the top surface 5 allows the propagating light to interact with touching objects 7 and thereby defines the touch surface 4. This is achieved by injecting the light into the panel 1 such that the light is reflected by total internal reflection (TIR) in the touch surface 4 as it propagates through the panel 1. The light may be reflected by TIR in the bottom surface 6 or against a reflective coating thereon. It is also conceivable that the propagation channel is spaced from the bottom surface 6, e.g. if the panel comprises multiple layers of different materials. The apparatus 100 may be designed to be overlaid on or integrated into a display device or monitor (not shown).

The apparatus 100 allows an object 7 that is brought into close vicinity of, or in contact with, the touch surface 4 to interact with the propagating light at the point of touch. In this interaction, part of the light may be scattered by the object 7, part of the light may be absorbed by the object 7, and part of the light may continue to propagate in its original direction across the panel 1. Thus, the touching object 7 causes a local frustration of the total internal reflection, which leads to a decrease in the energy (or equivalently, the power or intensity) of the transmitted light, as indicated by the thinned lines "i" downstream of the touching objects 7 in FIG. 1A.

The emitters 2 are distributed along the perimeter of the touch surface 4 to generate a corresponding number of light sheets inside the panel 1. Each light sheet is formed as a beam of light that expands (as a "fan beam") in the plane of the panel 1 while propagating in the panel 1 from a respective incoupling region/point on the panel 1. The detectors 3 are distributed along the perimeter of the touch surface 4 to receive the light from the emitters 2 at a number of spaced-apart outcoupling regions/points on the panel 1. It should be understood that the incoupling and outcoupling regions/points merely refer to the positions where the beams enter and leave, respectively, the panel 1. The light from each emitter 2 will propagate inside the panel 1 to a number of different detectors 3 on a plurality of light propagation paths D. Even if the light propagation paths D correspond to light that propagates by internal reflections inside the panel 1, the light propagation paths D may conceptually be represented as "detection lines" that extend across the touch surface 4 between pairs of emitters 2 and detectors 3, as shown in FIG. 1B. Thereby, the emitters 2 and detectors 3 collectively define a grid of detection lines D ("detection grid") on the touch surface 4. The spacing of detection lines in the detection grid may define the spatial resolution of the apparatus 100, i.e. the smallest object that can be detected on the touch surface 4.

The detectors 3 collectively provide an output signal, which is received and sampled by a signal processor 10. The output signal contains a number of sub-signals, also denoted "projection signals", each representing the energy of light emitted by a certain light emitter 2 and received by a certain light detector 3. Depending on implementation, the signal processor 10 may need to process the output signal for separation of the individual projection signals. The projection signals represent the received energy, intensity or power of light received by the detectors 3 on the individual detection lines D. Whenever an object touches a detection line, the received energy on this detection line is decreased or "attenuated".

Figure 2:
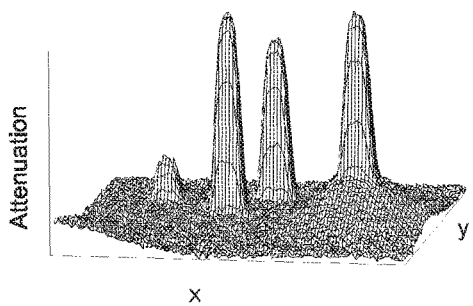
FIG. 2 is a 3D plot of an attenuation pattern generated based on energy signals from an optical touch-sensitive apparatus.

The signal processor 10 may be configured to process the projection signals so as to determine a property of the touching objects, such as a position (e.g. in the x, y coordinate system shown in FIG. 1B), a shape, or an area. This determination may involve a straight-forward triangulation based on the attenuated detection lines, e.g. as disclosed in U.S. Pat. No. 7,432,893 and WO2010/015408, or a more advanced processing to recreate a distribution of attenuation values (for simplicity, referred to as an "attenuation pattern") across the touch surface 1, where each attenuation value represents a local degree of light attenuation. An example of such an attenuation pattern is given in the 3D plot of FIG. 2. The attenuation pattern may be further processed by the signal processor 10 or by a separate device (not shown) for determination of a position, shape or area of touching objects. The attenuation pattern may be generated e.g. by any available algorithm for image reconstruction based on projection signal values, including tomographic reconstruction methods such as Filtered Back Projection, FFT-based algorithms, ART (Algebraic Reconstruction Technique), SART (Simultaneous Algebraic Reconstruction Technique), etc. Alternatively, the attenuation pattern may be generated by adapting one or more basis functions and/or by statistical methods such as Bayesian inversion. Examples of such reconstruction functions designed for use in touch determination are found in WO2009/077962, WO2011/049511, WO2011/139213, WO2012/050510 and US2014/0300572, all of which are incorporated herein by reference. Conventional image reconstruction techniques are found in the mathematical literature, e.g. "The Mathematics of Computerized Tomography" by Natterer, and "Principles of Computerized Tomographic Imaging" by Kak and Slaney.

In the illustrated example, the apparatus 100 also includes a controller 12 which is connected to selectively control the activation of the emitters 2 and, possibly, the readout of data from the detectors 3. Depending on implementation, the emitters 2 and/or detectors 3 may be activated in sequence or concurrently, e.g. as disclosed in WO2010/064983. The signal processor 10 and the controller 12 may be configured as separate units, or they may be incorporated in a single unit. One or both of the signal processor 10 and the controller 12 may be at least partially implemented by software executed by a processing unit 14.

It is to be understood that FIG. 1 merely illustrates one example of a touch-sensitive apparatus. For example, instead of injecting and detecting light via the edge surface that connects the boundary surfaces 5, 6, light may be coupled into and/or out of the panel 1 via the top and/or bottom surfaces 5, 6, e.g. by the use of dedicated coupling elements attached to the panel 1. It is also conceivable that the light is coupled into and out of the panel 1 through different portions of the panel, e.g. via the boundary surface 5 and the boundary surface 6, respectively. Examples of alternative FTIR-based touch systems are e.g. disclosed in U.S. Pat. No. 7,432,893, WO2010/046539, WO2012105893 and WO2013/089622, which are all incorporated herein by this reference.

Embodiments of the invention apply specific design rules for the ordering of emitters 2 and detectors 3 along the perimeter of the touch surface 4 to achieve desired properties of the detection grid on the touch surface 4, as will be further explained in relation to the top plan views in FIGS. 3-7. Each of the figures illustrates a grid of detection lines that are defined between horizontal rows 22A, 22B and vertical rows 20A, 20B of emitters 2 (filled circles) and detectors 3 (filled squares) on ends or sides of a touch surface. The components 2, 3 in any row are consecutively arranged in a non-overlapping way. For ease of presentation, the panel 1 and its touch surface 4 has been omitted in FIGS. 3-7.

Figure 3A:
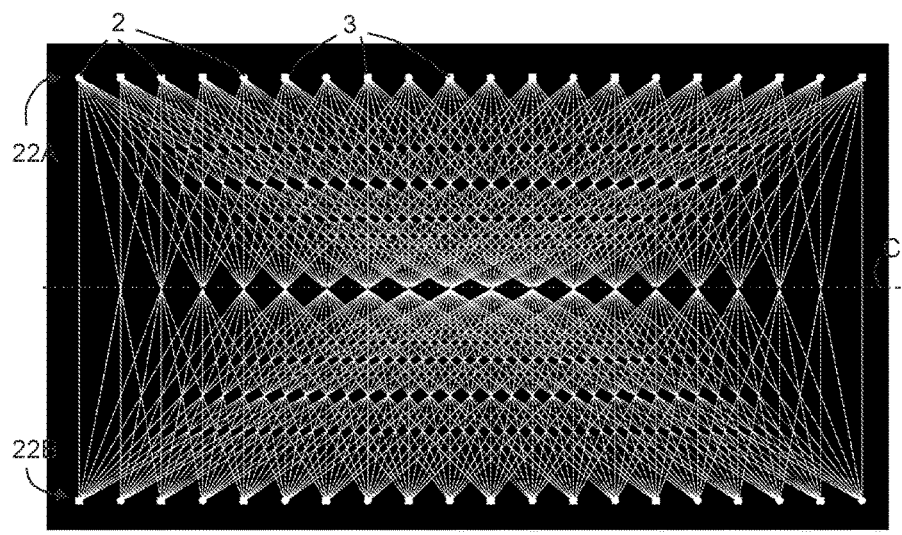
FIG. 3A is a top plan view of a grid of detection lines in a prior art apparatus for one type of arrangement with opposite and parallel rows with interleaved emitters and detectors.

FIG. 3A is illustrating a conventional fan beam arrangement, wherein emitters 2 and detectors 3 are arranged in an alternating fashion with equal spacing in two rows along opposite ends of the touch surface 4, herein denoted "first interleaved arrangement". The first interleaved arrangement results in a symmetric detection grid, and each intersection point on the center line "C" between the rows 22A, 22B contains a large number of detection lines. As shown, this results in "gaps" in the detection grid.

Figure 3B:
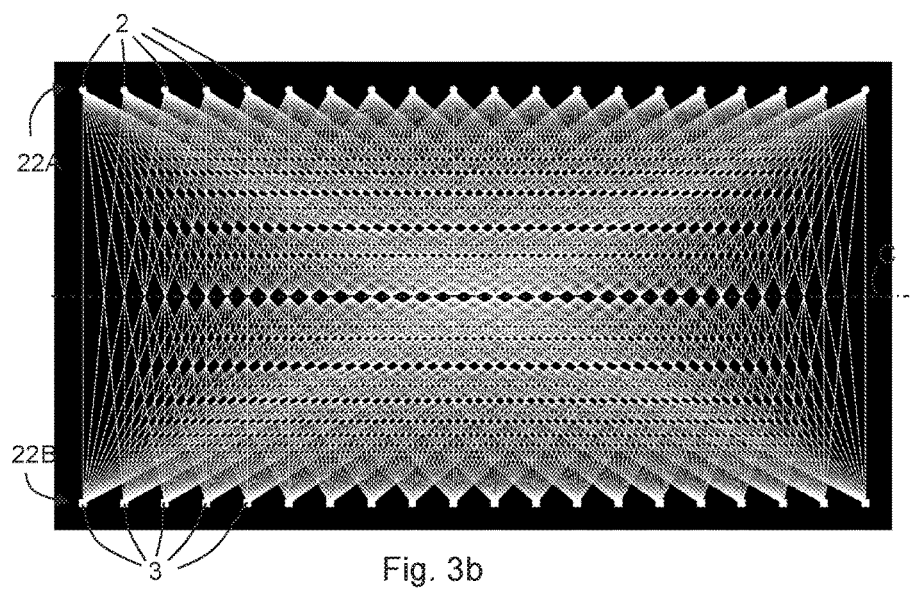
FIG. 3B is a top plan view of a grid of detection lines in an apparatus which is designed in accordance with embodiments of the invention.

FIG. 3B is illustrating two base rows 22A, 22B according to one embodiment, where the base rows 22A, 22B are arranged in two rows along opposite ends of the touch surface 4. One base row 22A comprises only emitters 2 and the other base row 22B comprises only detectors 3 with equal spacing. The number of components and size of spacing is the same as in FIG. 3A. The arrangement with base rows with one row 22A with only emitters 2 and one row 22B with only detectors 3 results in a symmetric detection grid, with "gaps" in the detection grid that are smaller than the "gaps" in the detection grid of FIG. 3A. Thus, the arrangement in FIG. 3B provides an increased uniformity and reduced spacing of propagation paths compared to the example shown in FIG. 3A.

Figure 4A:
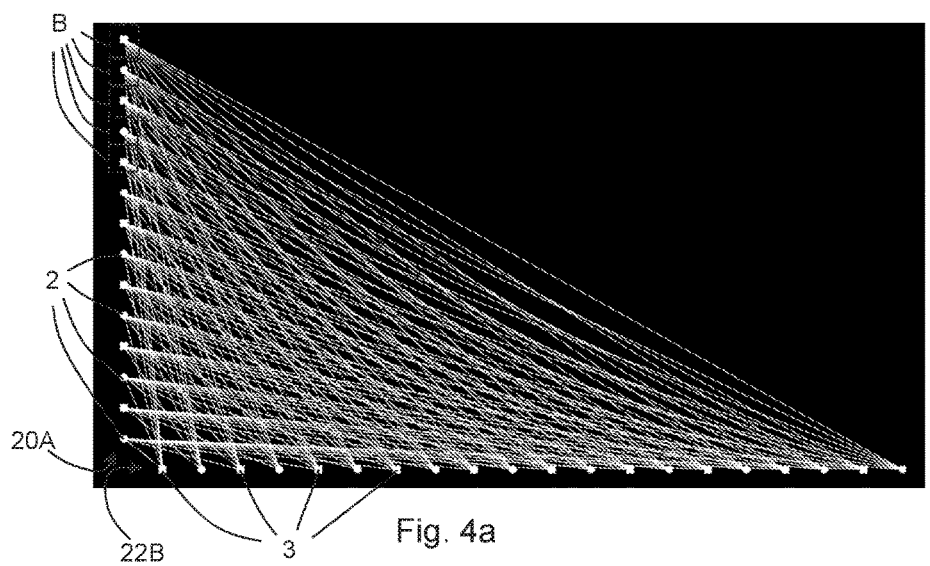
FIG. 4A is a top plan view of a grid of detection lines in a prior art apparatus with an arrangement with orthogonal rows with interleaved emitters and detectors.

FIG. 4A is illustrating another conventional fan beam arrangement wherein emitters 2 and detectors 3 are arranged in blocks B in an alternating fashion with equal spacing in two rows 20A, 22B along orthogonal ends of the touch surface 4, herein denoted "second interleaved arrangement". Each block B comprises one emitter 2 or detector 3. The second interleaved arrangement results in a symmetric detection grid.

Another conventional fan beam arrangement that is not illustrated in any figure is the "L-shaped" arrangement where two rows are arranged with the same type of component 2, 3 along orthogonal ends of a touch surface 4. Thus, two orthogonal rows are arranged with detectors 3, and the other two orthogonal rows are arranged with emitters 2. As understood by the skilled person, the orthogonal rows with the same type of component do not create any detection lines that can be detected in between the rows, and a lot of gaps with no propagation paths in large angular ranges are obtained. However, it may be advantageous to have rows with only one kind of component, or a majority of only one component, as it is an arrangement that may be easier to implement.

Figure 4B:
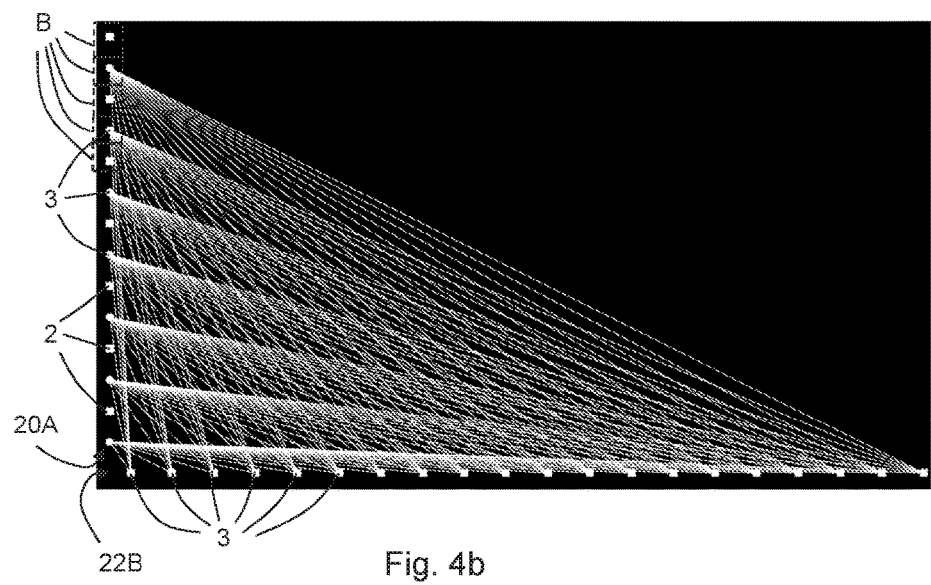
FIG. 4B is a top plan view of a grid of detection lines in an apparatus which is designed in accordance with embodiments of the invention.

FIG. 4B is illustrating one base row 22B and one interleaved row 20A arranged along orthogonal ends of the touch surface 4. The base row 22B comprises only detectors 3 with equal spacing, and the interleaved row 20A comprises emitters 2 and detectors 3 arranged in an alternating fashion with equal spacing. The interleaved row 20A is subdivided into blocks B, here with one emitter 2 or detector 3 in each block B. The arrangement results in a detection grid with essentially the same number of detections lines as in the detection grid in FIG. 4A. The detection lines in FIG. 4B are however offset compared to the detection lines in FIG. 4A. Compared to the embodiment in FIG. 4A, the arrangement in FIG. 4B provides new detection lines from emitters 2 in the interleaved row 20A to the detectors 3 in the base row 22B, but loses detection lines from emitters 2 in the base row to detectors 3 in the interleaved row 20A. Compared to the "L-shaped" arrangement (not shown), the arrangement in FIG. 4B provides more evenly distributed detection lines on the touch surface 4, contributing to an improved spatial resolution. Compared to the arrangement of FIG. 4A the arrangement of FIG. 4B may create more gaps in the detection grid. However, when combined with two or more rows of components along the other opposite ends of the touch surface 4 the arrangement of FIG. 4B may create fewer and/or smaller gaps than an arrangement of four interleaved rows, as will be discussed with reference to FIGS. 5 and 6.

The embodiments shown in FIGS. 3B and 4B have been illustrated with components arranged along only two ends of the touch surface 4 to illustrate general benefits with the embodiments arranged according to certain design rules. The embodiments in FIGS. 3B and 4B can be combined to benefit from a resulting symmetric and enhanced detection grid obtained when four ends of the touch surface 4 each is aligned with a row 20A, 20B, 22A, 22B of components 3, 4. Two of the rows 20A, 20B, 22A, 22B are interleaved rows each having an interleaved distribution of emitters 2 and detectors 3, and the further two rows 20A, 20B, 22A, 22B are base rows each having a distribution of components 2, 3 comprising at least 70% emitters 2 or detectors 3.

Figure 10:
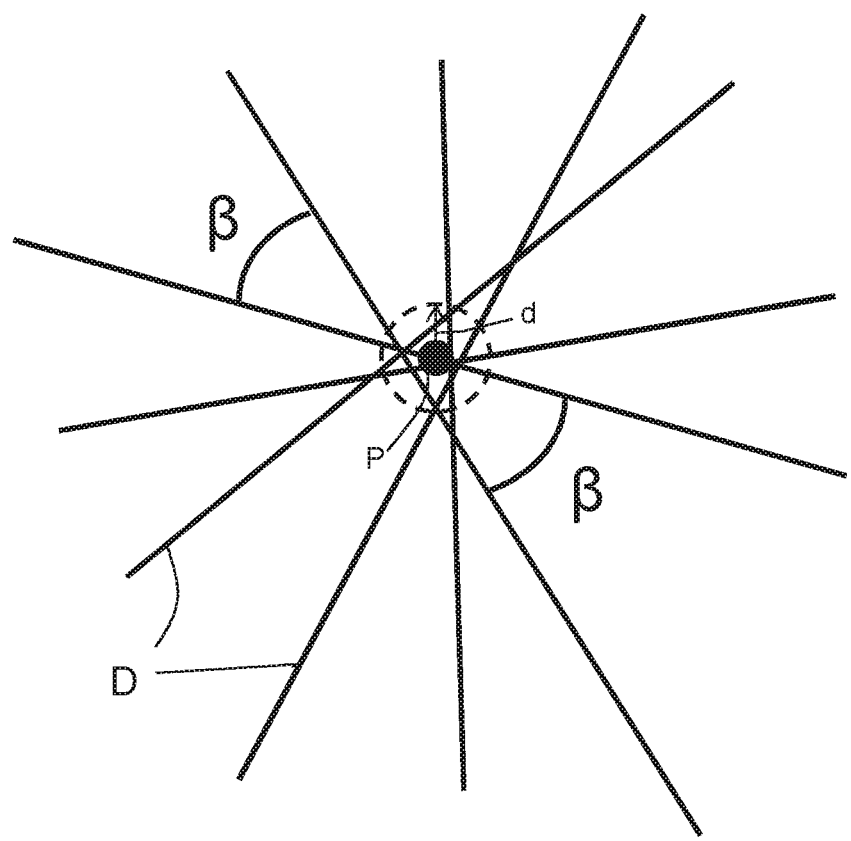
FIG. 10 is illustrating detection lines within a certain distance to a point on a touch surface.

The above-described general design principle for the touch-sensitive apparatus makes it possible to achieve an increased spatial resolution and/or accuracy of the touch-sensitive apparatus without increasing the number of components per unit length. Thus, embodiments of the invention make it possible to attain a higher spatial resolution and/or accuracy for a given number of electro-optical components (emitters and detectors). The resolution is improved with a denser detection grid and the accuracy is improved when the detection lines are distributed over a large angular range. To obtain a certain spatial resolution and accuracy, it is desired that each point on the touch surface shall have a certain number of detection lines within a certain distance d to that point, and with a distribution of angles for the detection lines. FIG. 10 illustrates an enlarged view of a point P on the touch surface with a number of nearby detection lines D within the certain distance d to the point. The detection lines are angularly distributed. There are however angular gaps β between the detection lines, where there are no detection lines. These angular gaps β reduces the accuracy. The angular gaps β between the detection lines should therefore be small, so each point on the touch surface may have detection lines with angular gaps of less than 20°, preferably less than 10° or 5°, between the detection lines within a certain distance d to the point when the touch apparatus is being operated. The distance d may e.g. be an approximated radius of a fingerpalm.

Figure 5:
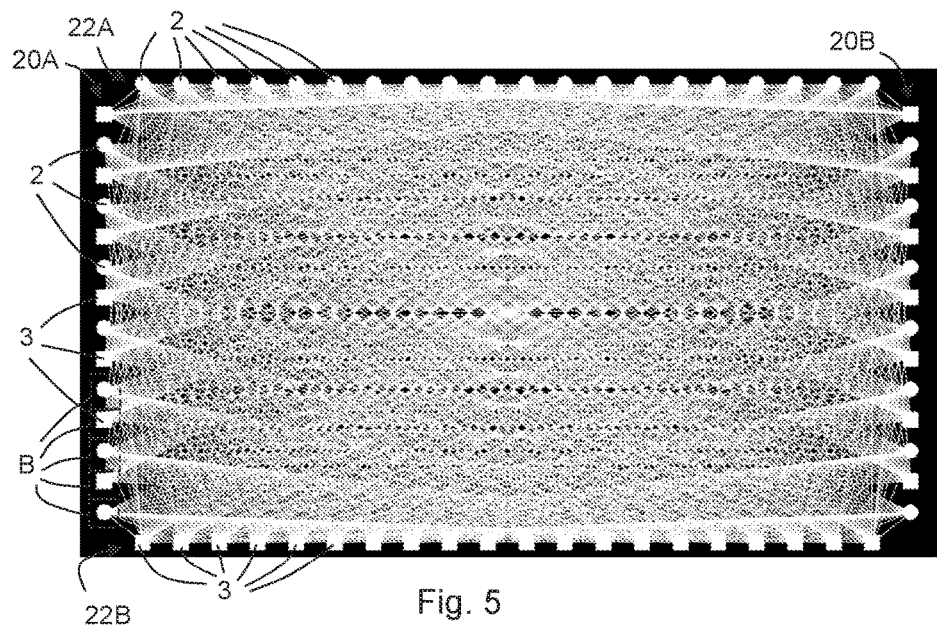

In FIG. 5 an embodiment is illustrated comprising a first set of opposite and essentially parallel rows 20A, 20B of components 2, 3 and a second set of opposite and essentially parallel rows 22A, 22B of components 2, 3. The second set of opposite and parallel rows 22A, 22B is essentially orthogonal to the first set of opposite and parallel rows 20A, 20B. In this embodiment, the interleaved rows constitute the first set of opposite and parallel rows 20A, 20B. The base rows then constitute the second set of opposite and parallel rows 22A, 22B. One base row 22A comprises only emitters 2 and thus has a distribution of components 2, 3 of 100% emitters 2. The other base row 22B comprises only detectors 3 and thus has a distribution of components 2, 3 of 100% detectors 3. The base rows 22A, 22B may have another distribution of components 2, 3, however at least 70% emitters 2 or detectors 3 each. The interleaved rows 20A, 20B are of the type single interleaved, wherein each block B comprises only one component 2, 3. The touch surface 4 here has a rectangular form, and each of the rows 20A, 20B of components 2, 3 of the first set is arranged along one short side of the touch surface 4, and each row 22A, 22B of components 2, 3 of the second set is arranged along one long side of the touch surface 4. An apparatus with an arrangement as illustrated in FIG. 5 may thus have the drawback of larger gaps in the detection grid as illustrated in FIG. 4B, but will also have the benefits of the detection grid as illustrated in FIG. 3B and explained in the text thereto. The combination of the arrangements of FIGS. 3B and 4B gives a detection grid with generally smaller spatial gaps and smaller angular gaps, as compared to a combination of the arrangements of FIGS. 3A and 4A with four interleaved rows at four ends of a touch surface 4.

Figure 6:
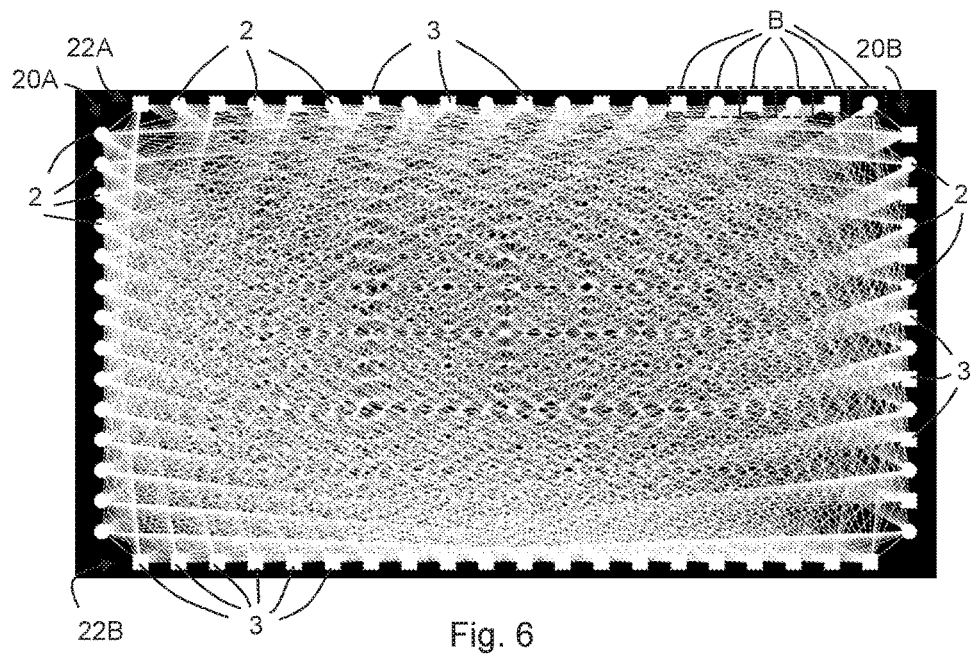

In FIG. 6 a further embodiment is illustrated comprising a first set and a second set of components in similarity with the embodiment shown in FIG. 5. However, in this embodiment the interleaved rows constitute one row 20B of the first set of opposite and parallel rows 20A, 20B, and one row 22A of the second set of opposite and parallel rows 22A, 22B. The base rows then constitute the other row 20A of the first set of opposite and parallel rows 20A, 20B, and the other row 22B of the second set of opposite and parallel rows 22A, 22B. One base row 20A comprises only emitters 2 and thus has a distribution of components 2, 3 of 100% emitters 2. The other base row 22B comprises only detectors 3 and thus has a distribution of components 2, 3 of 100% detectors 3. The base rows 20A, 22B may have another distribution of components 2, 3, however at least 70% emitters 2 or detectors 3 each. The interleaved rows 20B, 22A are of the type single interleaved, wherein each block B comprises only one component 2, 3. The touch surface 4 here has a rectangular form, and in similarity with the embodiment in FIG. 5, each of the rows 20A, 20B of components 2, 3 of the first set is arranged along one short side of the touch surface 4, and each row 22A, 22B of components 2, 3 of the second set is arranged along one long side of the touch surface 4. This arrangement of components also gives a detection grid with generally smaller spatial gaps and smaller angular gaps, as compared to the combination of the arrangements of FIGS. 3A and 4A with four interleaved rows at four ends of a touch surface 4.

In FIG. 7 a still further embodiment is illustrated comprising a first set and a second set of components in similarity with the embodiments shown in FIGS. 5 and 6. Also, as in the embodiment shown in FIG. 5, the interleaved rows constitute the first set of opposite and parallel rows 20A, 20B. The base rows then constitute the second set of opposite and parallel rows 22A, 22B. One base row 22A comprises a number of 17 emitters 2 out of 20 components, thus more than 70% of emitters 2. The other base row 22B comprises a number of 17 detectors 3 out of 20 components in the base row 22B, thus more than 70% of detectors 3. The components 2, 3 in the interleaved rows 20A, 20B are subdivided into blocks B. The interleaved rows 20A, 20B are here of the type irregular-interleaved, wherein the numbers of components 2, 3 in each block B is irregularly chosen. The number of components 2, 3, may e.g. be chosen according to an optimization scheme, depending e.g. on the total available number of components 2, 3, size of touch surface, desired resolution of touch surface etc. According to one embodiment, the number of components 2, 3 in each block B may be randomly chosen. Each block B comprises one, two or three components 2, 3 of either the type emitter 2 or detector 3. Thus, each block B contains only emitters 2 or detectors 3. Adjacent blocks B have a different type of component 2, 3. As can be seen in the FIG. 7, the interleaved row 20A to the left in the Figure has a plurality of blocks B with only one emitter 2 or detector 3, and one block B with two detectors 3 and one block B with two emitters 2. The interleaved row 20B to the right in the Figure has a plurality of blocks B with only one emitter 2 or detector 3, and two blocks B with two detectors 3 and two blocks B with two emitters 2. In similarity with FIGS. 5 and 6, the touch surface 4 has a rectangular form, and each of the rows 20A, 20B of components 2, 3 of the first set is arranged along one short side of the touch surface 4, and each row 22A, 22B of components 2, 3 of the second set is arranged along one long side of the touch surface 4. Other examples of arrangements of components within a row are found in WO2013176614 and WO2013176613, which are incorporated herein by reference.

When the apparatus is provided with communicating possibilities, e.g. integrated into a laptop or smartphone, disturbances such as electrostatic discharge (ESD) from antennas might disturb the detected energy. This problem increases when the detectors 2 are located close to the antennas. In the embodiments described, one of the ends of the touch surface 4 will have a base row with less number of detectors 3, or no detectors 3 at all. This base row may be arranged to be closest to the antenna/antennas, e.g. on the most distal end of the touch surface 4. For example, this distal end may be close to an upper edge of a laptop comprising a display with touch-sensitive capabilities as initially described. Also, this distal end may become more exposed to other ambient disturbances, making it more suitable for emitters 3 that may be less sensitive to disturbances than detectors 2.

FIGS. 8A-8C are illustrating examples of interleaved distributions of the interleaved rows according to some embodiments. The principles of these interleaved distributions can be used to arrange the components in the interleaved rows in any of the herein described embodiments. In FIGS. 8A-8C only some components 2, 3 are illustrated to show the principle, but it is understood that the number of component can be increased or decreased as desired to suit a certain design and/or size of touch surface 4. FIGS. 8A-8B are illustrating interleaved distributions of the type multiple interleaved, wherein each block B comprises the same multiple of components. In the FIG. 8A each block B comprises two emitters 2 only or two detectors 3 only. The blocks B are then alternatingly arranged such that two adjacent blocks B do not comprise the same type of components 2, 3. In the FIG. 8B each block B comprises three emitters 2 only or three detectors 3 only. The blocks B are then alternatingly arranged such that two adjacent blocks B do not comprise the same type of components 2, 3. FIG. 8C is illustrating an interleaved distribution of a type semi-interleaved, wherein blocks B with the same type of components 2, 3 has the same number of components 2, 3, and wherein the number of emitters 2 in a block B is not the same as the number of detectors 3 in another block B. In FIG. 8C the number of detectors 3 in each block B with detectors is two, and the number of emitters 2 in each block B with only emitters is one. This example is shown to illustrate the principle, and many alternatives of a semi-interleaved distribution are possible. For example, the number of detectors 3 in each block B with detectors may be one or three. Further, the number of emitters 2 in each block B with emitters may be two or three.

In the above-described embodiments, all components 2, 3 are arranged with equi-distant center-to-center spacing within each row. Such a design may facilitate manufacture of the touch-sensitive apparatus. However, it is conceivable to achieve further improvements in terms of uniformity and/or gap size of the detection grid, by varying the spacing of the components 2, 3 within one or both of the interleaved rows. For example, the spacing between different blocks may be varied so that the blocks are arranged with alternating short/long spacing. Alternatively, the blocks in the interleaved rows may be arranged spatially separated from each other, which might enhance the spatial resolution. Spatially separated blocks may be defined by having a center-to-center spacing between adjacent components in different blocks that is larger than a center-to-center spacing between adjacent components within each block B. The components in each block may also be arranged spatially separated from each other, which also might enhance the spatial resolution. Spatially separated components in a block may be defined by having a center-to-center spacing between the adjacent components within the block B that is larger than a center-to-center spacing between adjacent components in different blocks B. Examples of spacings between adjacent blocks are found in WO2013/176615, which is incorporated herein by reference.

It should be noted that certain image reconstruction techniques, e.g. tomographic techniques, may require (or benefit from) a uniform angular distribution of detection lines on the touch surface 4, i.e. that the detection lines that intersect a respective reconstruction cell on the touch surface 4 are evenly distributed in the angular direction, and possibly also that the number of detection lines is approximately the same in all reconstruction cells. A reconstruction cell denotes a sub-area of the touch surface 4 which is assigned an attenuation value by the reconstruction process. It has been revealed that the embodiments described herein provide a detection grid with detection lines with a mix of angles beneficial when reconstructing an image of the touch surface.

As used herein, "horizontal", "vertical", "left" and "right" merely refer to directions on the drawings and does not imply any particular positioning of the panel 1.

According to one embodiment, the base rows may comprise one row with X number of emitters 2 and one row with Y number of detectors 3, wherein X is different from Y. Thus, a different number of components 2, 3 of each type can be had on each base row. In the above described embodiments, opposite rows have been illustrated with an equal number of components. However, the number of components on each side may be different.

As illustrated in FIG. 9, light from each emitter 2 may be propagating inside the panel 1 as a diverging beam with a beam diverging angle $\alpha$ from $\pm 45°$ to $\pm 90°$ from a normal vector N of a beam direction surface 15 of the emitter 2. The direction of the beam direction surface 15 determines the overall direction of the diverging beam. Here, the beam direction surface 15 is perpendicular to the touch surface 4, and the beam diverging angle $\alpha$ is parallel to the touch surface 4. For example, the diverging angle may be $\pm 45°$, $\pm 60°$, $\pm 75°$ or $\pm 90°$. The diverging beam may also diverge between the boundary surfaces 5, 6 of the panel 1, which is not illustrated in the figure.

Symmetry artefact may arise close to the edges of the touch surface 4, thus leaving gaps in the detection grid without propagation paths. These gaps may be reduced by arranging one or several extra components 2, 3, e.g. emitters 2, in any of the rows such that light from the emitter or emitters 2 strikes the previous gap in the detection grid. For example, in the arrangement in FIG. 4B one or several extra emitters 2 may be arranged in the base row between detectors 3 and be arranged to project a beam of light in the gap in the detection grid.

The present invention is not limited to the above-described embodiments. Various alternatives, modifications and equivalents may be used. For example, the touch surface 4 may have a rectangular form with equally sized ends. Therefore, the above embodiments should not be taken as limiting the scope of the invention, which is defined by the appending claims.

The invention claimed is:

1. A touch-sensitive apparatus, comprising:
   a panel defining a touch surface;
   a first set of opposite and substantially parallel rows of components, the first set of opposite and substantially parallel rows of components including emitters and detectors;
   a second set of opposite and substantially parallel rows of components, said second set of opposite and substantially parallel rows of components substantially orthogonal to the first set of opposite and substantially parallel rows of components, and the second set of opposite and substantially parallel rows of components including emitters and detectors;

wherein each emitter is configured to propagate an energy beam across the touch surface;

wherein each detector is configured to detect transmitted energy from at least one emitter;

wherein two rows from among the first and second sets of opposite and substantially parallel rows of components are interleaved rows, each of the interleaved rows having an interleaved distribution of emitters and detectors;

wherein another two rows from among the first and second sets of opposite and substantially parallel rows of components are base rows, each of the base rows having a distribution of components including at least 70% emitters or detectors; and wherein the distribution of components including at least 70% emitters or detectors is different from the interleaved distribution of emitters and detectors.

2. The touch-sensitive apparatus according to claim 1, wherein the first set of opposite and substantially parallel rows includes the interleaved rows.

3. The touch-sensitive apparatus according to claim 1, wherein the first set of opposite and substantially parallel rows includes a first of the interleaved rows; and the second set of opposite and substantially parallel rows includes a second of the interleaved rows.

4. The touch-sensitive apparatus according to claim 1, wherein the base rows include a first row with X number of emitters and a second row with Y number of detectors; and X is different from Y.

5. The touch-sensitive apparatus according to claim 1, wherein a first of the base rows has a distribution of components including at least 70% emitters; and a second of the base rows has a distribution of components including at least 70% detectors.

6. The touch-sensitive apparatus according to claim 1, wherein at least one of the base rows includes at least 80% emitters or detectors.

7. The touch-sensitive apparatus according to claim 1, wherein the base rows include a first row with only emitters and a second row with only detectors.

8. The touch-sensitive apparatus according to claim 1, wherein a first of the interleaved rows includes a plurality of sets of emitters and a plurality of sets of detectors;

the plurality of sets of emitters and the plurality of sets of detectors are interleaved with one another as a consecutive, non-overlapping distribution of alternating sets of components; and each of the alternating sets of components includes maximum of three components.

9. The touch-sensitive apparatus according to claim 8, wherein each of the alternating sets of components includes only one component.

10. The touch-sensitive apparatus according to claim 8, wherein each of the alternating sets of components includes multiple components; and the multiple components in each of the alternating sets of components are the same.

11. The touch-sensitive apparatus according to claim 8, wherein each of the alternating sets of components with the same type of component also has the same number of components; and a number of emitters in an alternating set of emitters is different from a number of detectors in an alternating set of detectors.

12. The touch-sensitive apparatus according to claim 1, wherein each emitter is configured to propagate a diverging beam.

13. The touch-sensitive apparatus according to claim 12, wherein each respective emitter is configured to propagate the diverging beam with a beam diverging angle α from about ±45° to about ±90° from a normal of a beam direction surface of the respective emitter, the beam diverging angle α being parallel to the touch surface.

14. The touch-sensitive apparatus according to claim 1, wherein each detector is configured to detect transmitted energy from at least two emitters.

15. The touch-sensitive apparatus according to claim 1, wherein said first set of opposite and substantially parallel rows of components and said second set of opposite and substantially parallel rows of components define a perimeter of non-overlapping and consecutive components around the touch surface.

16. The touch-sensitive apparatus according to claim 15, wherein the touch surface has a rectangular form;

each row of components in the first set of opposite and substantially parallel row of components is arranged along a short side of the touch surface; and each row of components in the second set of opposite and substantially parallel row of components is arranged along a long side of the touch surface.

17. The touch-sensitive apparatus according to claim 1, wherein at least one of the base rows includes at least 90% emitters or detectors.

18. The touch-sensitive apparatus according to claim 1, wherein each emitter is configured to propagate an energy beam across the touch surface inside the panel.

19. The touch-sensitive apparatus according to claim 1, wherein the interleaved distribution of emitters and detectors includes at least one emitter and at least one detector; and the interleaved distribution of emitters and detectors includes less than 70% emitters or detectors.

* * * * *